(12) United States Patent
Lawrence et al.

(10) Patent No.: US 12,180,894 B1
(45) Date of Patent: Dec. 31, 2024

(54) ELECTRIC STARTER VERIFICATION DURING GAS-TURBINE ENGINE BARRING

(71) Applicants: Rolls-Royce Corporation, Indianapolis, IN (US); Rolls-Royce North American Technologies, Inc., Indianapolis, IN (US)

(72) Inventors: Jeffrey Lawrence, Indianapolis, IN (US); Brian Joseph Huber, Indianapolis, IN (US); Erik A. Munevar, Indianapolis, IN (US); Douglas Keith Schetzel, II, Indianapolis, IN (US)

(73) Assignees: Rolls-Royce Corporation, Indianapolis, IN (US); Rolls-Royce North American Technologies, Inc., Indianapolis, IN (US)

(*) Notice: Subject to any disclaimer, the term of this patent is extended or adjusted under 35 U.S.C. 154(b) by 0 days.

(21) Appl. No.: 18/360,933

(22) Filed: Jul. 28, 2023

(51) Int. Cl.
*F02C 7/268* (2006.01)
*F01D 19/00* (2006.01)

(52) U.S. Cl.
CPC .............. *F02C 7/268* (2013.01); *F01D 19/00* (2013.01); *F05D 2220/323* (2013.01); *F05D 2260/85* (2013.01); *F05D 2270/092* (2013.01)

(58) Field of Classification Search
CPC .. F02C 7/32; F02C 7/266; F02C 7/268; F05D 2260/85; F01D 25/36
See application file for complete search history.

(56) References Cited

U.S. PATENT DOCUMENTS

| | | | |
|---|---|---|---|
| 5,899,411 A | 5/1999 | Latos et al. | |
| 6,704,625 B2 * | 3/2004 | Albero | B64D 13/06 244/58 |

(Continued)

FOREIGN PATENT DOCUMENTS

| | | | | |
|---|---|---|---|---|
| EP | 3640455 A1 | 4/2020 | | |
| EP | 4086175 A1 * | 11/2022 | ........... | B64D 13/006 |

(Continued)

OTHER PUBLICATIONS

Certification Authorities for Large Transport Aircraft (CATA), "CATA Worklist Item TCCA-002—In-Flight All-Engines-Out Restart Guidance", US Federal Aviation Administration, Rev. 11/31/2020, pp. 1, 5, 7-9, see URL of instant reference in box V below. (Year: 2020) This is a continuation of box U above: downloaded on Nov. 26, 2023 from URL: https://www.faa.gov/sites/faa.gov/files/aircraft/air_cert/design_approvals/transport/TCCA-002_ in-flight_all_engines_out_restart_guidance.pdf (Year: 2002).

(Continued)

*Primary Examiner* — Craig Kim
(74) *Attorney, Agent, or Firm* — Shumaker & Sieffert, P.A.

(57) ABSTRACT

An example system includes a first gas-turbine engine configured to propel an aircraft, the first gas-turbine engine comprising a first electric starter, the first electric starter configured to rotate a spool of the first gas-turbine engine; and one or more controllers collectively configured to: cause, following operation of the first gas-turbine engine, the first electric starter to perform barring of the first gas-turbine engine; measure, during the barring of the first gas-turbine engine, values of one or more parameters of the first gas-turbine engine; and determine, based on the values of the one or more parameters, whether the first electric starter (Continued)

is available for use in performing mid-air restart of the first gas-turbine engine.

13 Claims, 9 Drawing Sheets

(56) References Cited

U.S. PATENT DOCUMENTS

| | | | | |
|---|---|---|---|---|
| 9,664,070 | B1* | 5/2017 | Clauson | F02C 7/277 |
| 11,300,056 | B2* | 4/2022 | Kempers | F02C 7/275 |
| 11,873,765 | B1* | 1/2024 | Humes | F02C 7/32 |
| 11,898,489 | B2* | 2/2024 | Bemment | F02C 3/04 |
| 2006/0260323 | A1* | 11/2006 | Moulebhar | F02C 6/08 |
| | | | | 60/793 |
| 2007/0151258 | A1* | 7/2007 | Gaines | F16H 37/0826 |
| | | | | 60/801 |
| 2008/0279675 | A1* | 11/2008 | Ullyott | F02C 9/46 |
| | | | | 701/100 |
| 2011/0030385 | A1 | 2/2011 | Ellans et al. | |
| 2012/0119020 | A1 | 5/2012 | Burns et al. | |
| 2013/0327014 | A1 | 12/2013 | Moulebhar | |
| 2014/0117148 | A1 | 5/2014 | Dyrla et al. | |
| 2014/0311260 | A1* | 10/2014 | Staehli | F01D 25/36 |
| | | | | 74/25 |
| 2015/0322864 | A1 | 11/2015 | Dooley et al. | |
| 2017/0234167 | A1* | 8/2017 | Stachowiak | F01D 21/00 |
| | | | | 416/1 |
| 2017/0328282 | A1 | 11/2017 | Jensen et al. | |
| 2018/0193782 | A1 | 7/2018 | Bisson et al. | |
| 2018/0202408 | A1 | 7/2018 | Majima | |
| 2020/0001978 | A1 | 1/2020 | Yakobov et al. | |
| 2020/0122709 | A1 | 4/2020 | Cunningham et al. | |
| 2020/0123979 | A1 | 4/2020 | Kusnierek et al. | |
| 2020/0123980 | A1 | 4/2020 | Kusnierek et al. | |
| 2021/0062720 | A1* | 3/2021 | Kempers | F02C 7/275 |
| 2021/0115857 | A1 | 4/2021 | Collopy | |
| 2021/0355881 | A1 | 11/2021 | Lefebvre | |
| 2022/0063826 | A1 | 3/2022 | Hiett et al. | |
| 2022/0220900 | A1 | 7/2022 | Karnofski et al. | |
| 2023/0304446 | A1* | 9/2023 | Smilek | F01D 21/20 |

FOREIGN PATENT DOCUMENTS

| | | | | |
|---|---|---|---|---|
| EP | 4206453 | A1 | 7/2023 | |
| EP | 4249732 | A1 * | 9/2023 | F01D 19/02 |
| GB | 2616901 | A * | 9/2023 | F01D 19/02 |

OTHER PUBLICATIONS

U.S. Appl. No. 17/819,509, filed Aug. 12, 2022, naming inventors Schenk et al.

U.S. Appl. No. 17/819,527, filed Aug. 12, 2022, naming inventors Schenk et al.

U.S. Appl. No. 18/360,959, filed Jul. 28, 2023, naming inventors Schenk et al.

U.S. Appl. No. 18/361,075, filed Jul. 28, 2023, naming inventors Lawrence et al.

Extended Search Report from counterpart European Application No. 23218644.5 dated Jun. 11, 2024, 6 pp.

* cited by examiner

ELECTRIC STARTER VERIFICATION DURING GAS-TURBINE ENGINE BARRING

TECHNICAL FIELD

This disclosure relates to starting gas-turbine engines.

BACKGROUND

Turbine engines extract energy to perform work by compressing a working fluid, mixing a fuel into the compressed working fluid, igniting the fuel/fluid mixture, and expanding the combusted fuel/fluid mixture through a turbine. When a turbine is operating, a portion of the extracted energy is provided as the work input to the engine's compressor, thereby making the operation of the turbine self-sustaining. Prior to reaching this self-sustaining point, the work input to drive the compressor may be supplied by some system other than the turbine(s). These other systems often incorporate a starter that provides the motive force to turn the engine compressor, thereby providing an airflow to the turbine that can, eventually, extract and provide enough work output to drive the compressor.

SUMMARY

Several different starter types may be used to start gas-turbine engines. Some example gas-turbine engine starter types include, air-turbine starters, electrical starters, hydraulic starters, and gas-cartridge starters. Typically, a particular implementation may use only a single starter type (e.g., just one of an air-turbine starter or an electric starter, but not both). For safety and/or certification reasons, the starter of a gas-turbine engine may be required to be capable of starting the gas-turbine engine both on the ground (e.g., from rest) and in the air (e.g., mid-air restart).

However, in some scenarios, certain starter types may not be capable of meeting the certification requirements. For instance, an air-turbine starter may need a source of compressed air to operate. Normally, compressed air may be supplied from another propulsion gas-turbine engine (e.g., as bleed air) or from an auxiliary power unit (APU). In the unlikely event of complete engine loss (e.g., a dual engine flameout in a twin engine aircraft), the APU may be the only remaining source of compressed air. As a result, an aircraft with only air-turbine starters may require an operational APU in order to be dispatched (e.g., so that mid-air restart may be attempted in the event of complete engine loss). Such a requirement may undesirably reduce dispatch availability of the aircraft, and may require inclusion of the APU on a minimum equipment list (MEL) of the aircraft. If the APU could be omitted from the MEL, the aircraft could still conduct normal operations with a non-operational APU.

In accordance with one or more aspects of this disclosure, an aircraft may include a gas-turbine engine with multiple starter types. For instance, the aircraft may include both an electric starter and an air-turbine starter configured to start a particular gas-turbine engine. The inclusion of multiple starter types may enable starting of the gas-turbine engine using any of the available starters, any one of which may be capable of independently starting the gas-turbine engine. For instance, the air-turbine starter may be used where running the APU on the ground is allowed (e.g., due to noise restrictions from a ground cart), while the electric starter may be used where running the APU on the ground is not allowed. However, including multiple starter types may present one or more disadvantages. For instance, including both an electric starter and an air-turbine starter may result in additional weight.

In accordance with one or more aspects of this disclosure, an aircraft may include multiple starter types, at least one of which may be partially rated. For instance, the aircraft may include an air-turbine starter that is independently capable of starting the gas-turbine engine on the ground and an electric starter that is not independently capable of starting the gas-turbine engine on the ground. Including at least one starter type that is partially rated (e.g., not independently capable of starting the gas-turbine engine on the ground) may provide various advantages. As one example, a partially rated electric starter may be physically smaller and/or be lighter (e.g., weigh less) than a fully rated electric starter (e.g., a starter that is independently capable of starting the gas-turbine engine on the ground). While not independently capable of starting the gas-turbine engine, the partially rated starter type may be capable of assisting another starter type (e.g., a fully rated starter type or another partially rated starter type) to start the gas-turbine engine on the ground. Furthermore, the partially rated starter type may be capable re-starting the gas-turbine engine in the air (e.g., a mid-air restart after engine loss). As such, inclusion of a partially rated electric starter along with an air-turbine starter may enable an aircraft to perform mid-air restarts (e.g., for certification purposes) while still enabling an APU to be omitted from the MEL and avoiding the extra weight of a fully rated electric starter.

In some examples, it may be desirable to determine whether the electric starter (either fully or partially rated) will be available for use in performing restarts of the gas-turbine engine. In accordance with one or more aspects of this disclosure, a system of an aircraft may monitor one or more parameters of a gas-turbine engine and determine, based on the one or more parameters, whether an electric starter of the gas-turbine engine will be available. The system may monitor the parameters during various operations, such as start of the gas-turbine engine, barring of the gas-turbine engine, etc. In this way, the system may determine whether the electric starter will be available and may advise dispatch of the aircraft accordingly.

In some examples, the electric starter may be powered using electrical energy sourced from a battery, such as a low voltage battery. However, it may be desirable to minimize weight of an interconnection between the battery and a controller of the electric starter (e.g., switches that generate power signals that drive the electric starter). In accordance with one or more aspects of this disclosure, the system may include a bus bar interconnection between the battery and the controller. The bus bar may enable transport of relatively large current flows from the battery to the controller with minimal weight (e.g., as compared to cables). In this way, aspects of this disclosure may reduce the weight of the system.

As one example, a system may include a first gas-turbine engine of a plurality of gas-turbine engines that are configured to propel an aircraft, the first gas-turbine engine comprising: a first air-turbine starter of a plurality of air-turbine starters, the first air-turbine starter configured to rotate a spool of the first gas-turbine engine; and a first electric starter of a plurality of electric starters, the first electric starter configured to rotate the spool of the first gas-turbine engine, wherein the first electric starter is not independently capable of starting the first gas-turbine engine from rest while the aircraft is on the ground; a second gas-turbine engine of the plurality of gas-turbine engines, the second gas-turbine engine comprising: a second air-turbine starter of the plurality of air-turbine starters, the second air-turbine starter configured to rotate a spool of the second gas-turbine engine; and a second electric starter of the plurality of electric starters, the second electric starter configured to rotate the spool of the second gas-turbine engine, wherein the second electric starter is not independently capable of starting the second gas-turbine engine from rest while the aircraft is on the ground; and one or more controllers configured to control the plurality of gas-turbine engines.

As another example, a system includes a first gas-turbine engine configured to propel an aircraft, the first gas-turbine engine comprising: a first air-turbine starter, the first air-turbine starter configured to rotate a spool of the first gas-turbine engine; and a first electric starter, the first electric starter configured to rotate the spool of the first gas-turbine engine; and one or more controllers collectively configured to: cause, during a time period, the first-air turbine starter and the first electric starter to start the first gas-turbine engine while the aircraft is on the ground; measure, during the time period, values of one or more parameters of the first gas-turbine engine; and determine, based on the values of the one or more parameters, whether the first electric starter is available for use in performing mid-air restart of the first gas-turbine engine.

As another example, a system include a first gas-turbine engine configured to propel an aircraft, the first gas-turbine engine comprising a first electric starter, the first electric starter configured to rotate a spool of the first gas-turbine engine; one or more controllers collectively configured to: cause, following operation of the first gas-turbine engine, the first electric starter to perform barring of the first gas-turbine engine; measure, during the barring of the first gas-turbine engine, values of one or more parameters of the first gas-turbine engine; and determine, based on the values of the one or more parameters, whether the first electric starter is available for use in performing mid-air restart of the first gas-turbine engine.

As another example, a system includes a common electric starter controller configured to control electric starters of a plurality of gas-turbine engines that are configured to propel an aircraft, wherein the common electric starter comprises: a driver configured to generate, using electrical energy sourced from a battery of the aircraft, power signals that control the electric starters; and a plurality of bus bars configured to directly connect the common electric starter controller to the battery and transport the electrical energy from the battery to the common electric starter controller.

As another example, a system includes a first gas-turbine engine of a plurality of gas-turbine engines that are configured to propel an aircraft, the first gas-turbine engine comprising: a first electric starter of a plurality of electric starters, the first electric starter configured to rotate a spool of the first gas-turbine engine, wherein the first electric starter is rotationally connected to the spool of the first gas-turbine engine without a clutch; a second gas-turbine engine of the plurality of gas-turbine engines, the second gas-turbine engine comprising: a second electric starter of the plurality of electric starters, the second electric starter configured to rotate a spool of the second gas-turbine engine, wherein the second electric starter is rotationally connected to the spool of the second gas-turbine engine without a clutch; one or more controllers configured to control the plurality of gas-turbine engines; and a common electric starter controller configured to control the plurality of electric starters.

The details of one or more examples are set forth in the accompanying drawings and the description below. Other features, objects, and advantages will be apparent from the description and drawings, and from the claims.

DETAILED DESCRIPTION

Figure 1:
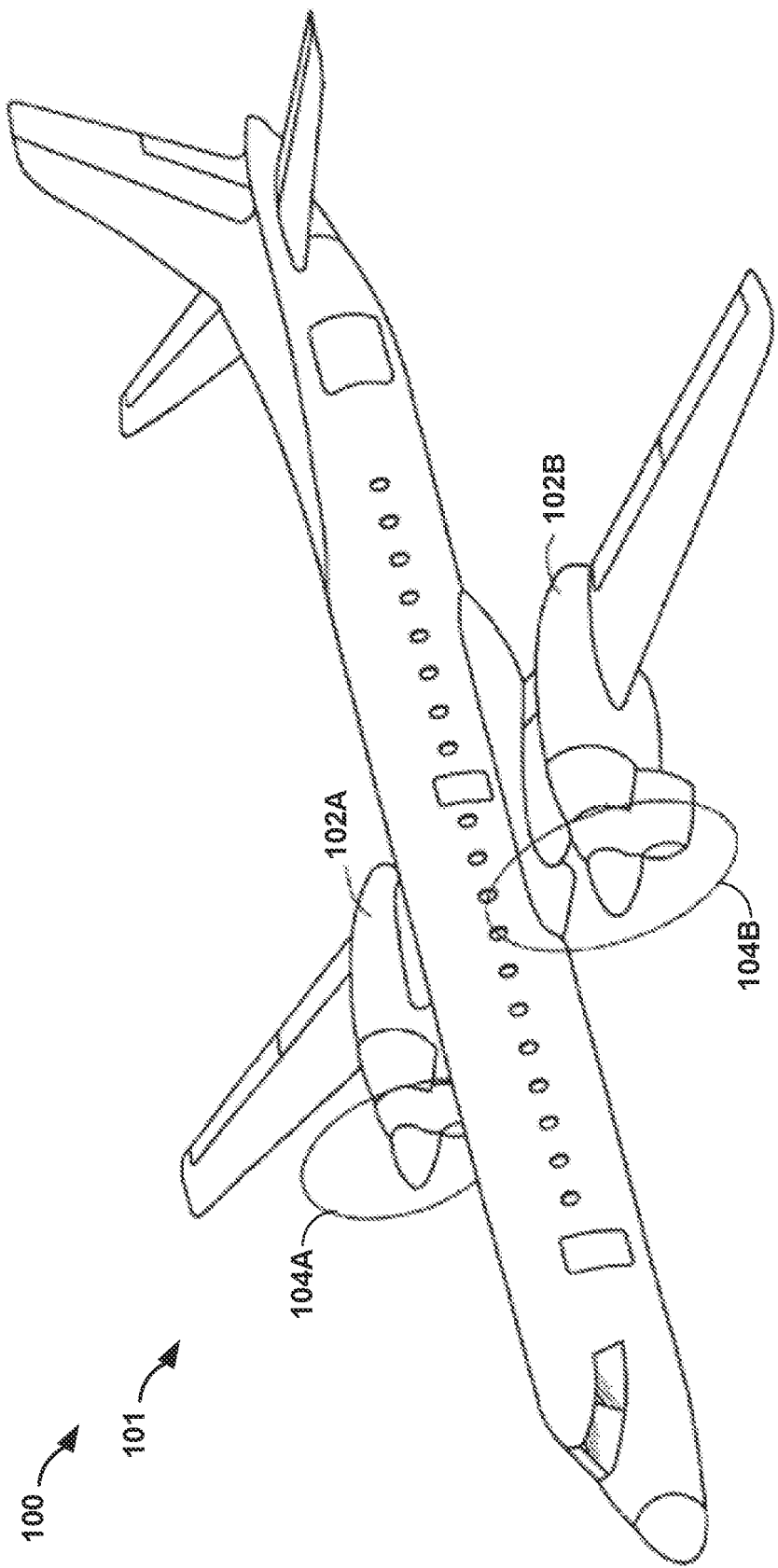
FIG. 1 is a conceptual diagram illustrating an aircraft having multiple types of starters for gas-turbine engines, in accordance with one or more aspects of this disclosure.

FIG. 1 is a conceptual diagram illustrating an aircraft having multiple types of starters for gas-turbine engines, in accordance with one or more aspects of this disclosure. As shown in FIG. 1, system 100 may include aircraft 101 and one or more gas-turbine engines 102A and 102B (collectively, "gas-turbine engines 102") that drive one or more propulsors 104A and 104B (collectively, "propulsors 104"). Aircraft 101 may be any type of aircraft including fixed wing, vertical takeoff and landing (VTOL), short takeoff and landing (STOL), rotorcraft, airplanes, and the like.

Gas-turbine engines 102 and propulsors 104 may collectively be configured to propel aircraft 101. While illustrated in FIG. 1 in a turbo-prop configuration in which propulsors 104 are propellers, gas-turbine engines 102 and propulsors 104 are not so limited. For instance, in other examples propulsors 104 may be fans such that gas-turbine engines 102 and propulsors 104 may be in a turbo-fan configuration (e.g., low or high bypass). Furthermore, while illustrated in FIG. 1 as being wing-mounted, gas-turbine engines 102 are not so limited. For instance, in other examples, gas-turbine engines 102 and propulsors 104 may be fuselage mounted (e.g., mounted to a fuselage of aircraft 101 via pylons).

Aircraft 101 may include multiple starter types for each of gas-turbine engines 102. As one example, aircraft 101 may include both an air-turbine starter and an electric starter for each of gas-turbine engines 102. For instance, aircraft 101 may include a first air-turbine starter and a first electric starter for gas-turbine engine 102A and a second air-turbine starter and a second electric starter for gas-turbine engine 102B. Aircraft 101 may include additional or different starter types. For instance, aircraft 101 may include two or more of air-turbine starters, electrical starters, hydraulic starters, and gas-cartridge starters.

Including multiple starter types may present various advantages. As one example, including starters that utilize different energy sources may provide improved resilience in the event an energy source is not available. For instance, include air-turbine starters that use compressed air and electric starters that use electrical energy may enable starting when either electrical energy or compressed air is available, but may not require both electrical energy and compressed air to be available.

However, including multiple starter types may also present various disadvantages. As one example, including multiple starter types may increase a total weight of the starting system. For instance, including both an air-turbine starter and an electric starter may result in a starting system weight that is greater than if the system included just one of the air-turbine starter and/or the electric starter. Increased starter system weight may be undesirable as it results in increased aircraft weight, resulting in greater fuel burn/reduced climb rate/shorter range etc. As another example, including multiple starter types may increase mechanical complexity as additional components may be needed to operatively couple the starters to the gas-turbine engine.

Furthermore, for safety and/or certification reasons, aircraft 101 may be required to be capable of starting gas-turbine engines 102 both on the ground (e.g., from rest) and in the air (e.g., mid-air restart). However, in some scenarios, certain starter types may not be capable of meeting the certification requirements. For instance, an air-turbine starter may need a source of compressed air to operate. Normally, compressed air may be supplied from another propulsion gas-turbine engine (e.g., as bleed air from another of gas-turbine engines 102) or from an auxiliary power unit (APU) of aircraft 101 (e.g., a non-propulsion gas-turbine engine). In the unlikely event of complete engine loss (e.g., a dual engine flameout in a twin-engine aircraft), the APU may be the only remaining source of compressed air available to operate the air-turbine starter. As a result, if aircraft 101 were to only have air-turbine starters, aircraft 101 may require an operational APU in order to be dispatched (e.g., so that mid-air restart may be attempted in the event of complete engine loss). Such a requirement may undesirably reduce dispatch availability of aircraft 101, and may require inclusion of the APU on a minimum equipment list (MEL) of aircraft 101. If the APU could be omitted from the MEL, aircraft 101 could still conduct normal operations with a non-operational APU.

In accordance with one or more aspects of this disclosure, aircraft 101 may include multiple starter types, at least one of which may be partially rated. A partially rated starter type may be a starter that is not independently capable of starting a gas-turbine engine of gas-turbine engines 102 in normal (e.g., non-emergency) scenarios. For instance, a partially rated starter may not be independently capable of starting a gas-turbine engine of gas-turbine engines 102 from rest while aircraft 101 is on the ground.

While not independently capable of starting the gas-turbine engine of gas-turbine engines 102, the partially rated starter type may be capable of assisting another starter type (e.g., a fully rated starter type or another partially rated starter type) to start the gas-turbine engine on the ground. Furthermore, the partially rated starter type may be capable re-starting the gas-turbine engine while aircraft 101 is in the air (e.g., a mid-air restart after engine loss). As such, inclusion of a partially rated electric starter along with an air-turbine starter may enable performance of mid-air restarts in aircraft 101 (e.g., for certification purposes) while still enabling an APU to be omitted from the MEL and avoiding the extra weight of a fully rated electric starter.

In operation, at least a fully rated starter may start gas-turbine engines 102 while aircraft 101 is on the ground. Aircraft 101 may proceed to takeoff for performance of a flight. In the unlikely event that one or more of gas-turbine engines 102 become non-operational during flight of aircraft 101, mid-air restart of the non-operational engines of gas-turbine engines 102 may be attempted. For instance, where gas-turbine engine 102A becomes non-operational but gas-turbine engine 102B is still operational (or an APU is operational), an air-turbine starter of gas-turbine engine 102A may be used to affect mid-air restart of gas-turbine engine 102A (e.g., using compressed air sourced from gas-turbine engine 102B or the APU). However, should all of gas-turbine engines 102 be non-operational at the same time (and no other source of compressed air is available), the air-turbine starters may not be available for attempting the mid-air restart.

In accordance with one or more aspects of this disclosure, a partially rated electric starter may be used to perform mid-air restart of a gas-turbine engine of gas-turbine engines 102. For instance, where both gas-turbine engines 102A and 102B become non-operational during flight, an electric starter of gas-turbine engine 102A may rotate a spool (e.g., a high-pressure or HP spool) of gas-turbine engine 102A to affect a mid-air restart of gas-turbine engine 102A. In this way, the electric starter may provide the ability to perform mid-air restart while avoiding the extra weight of being a fully rated electric starter.

Figure 2:
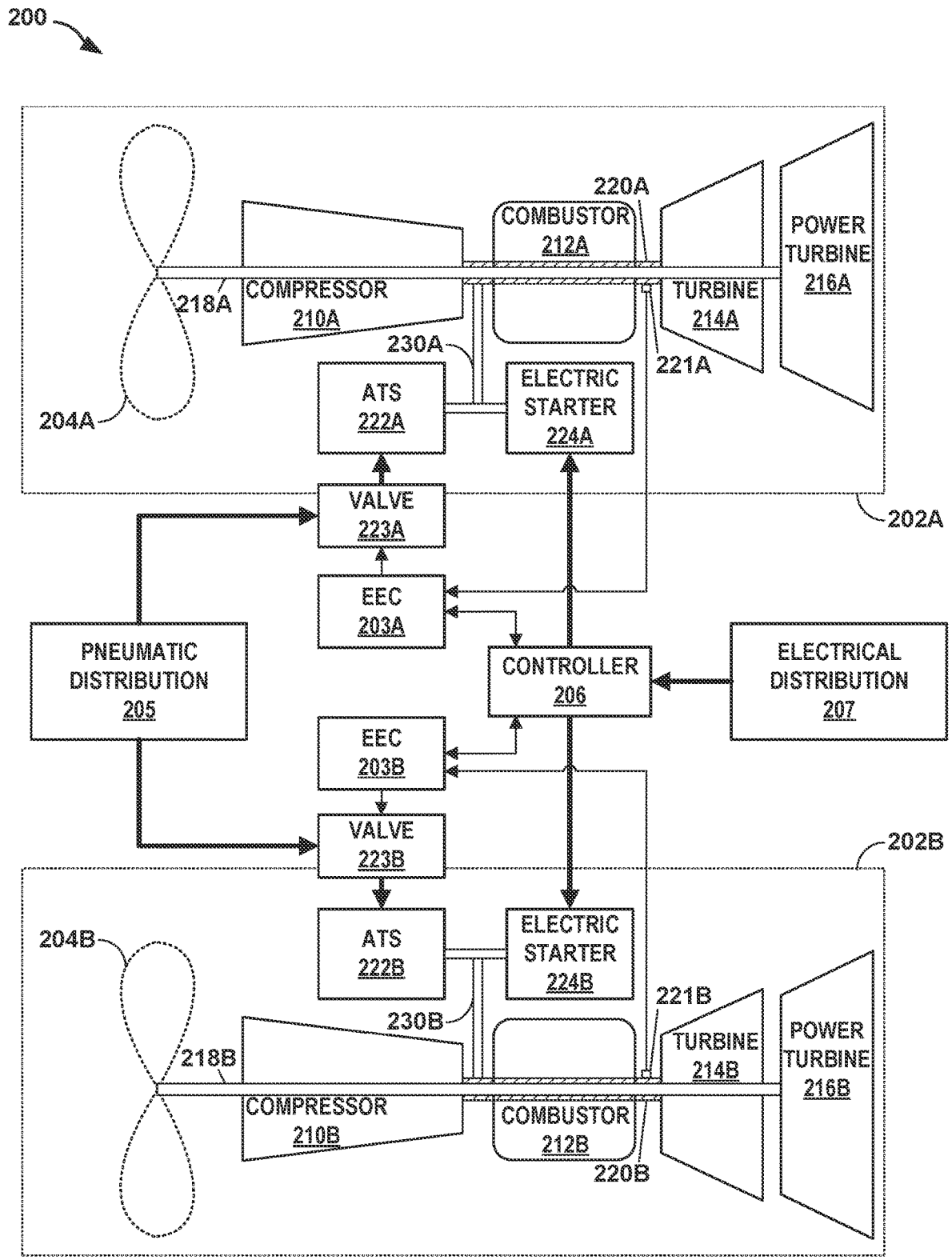
FIG. 2 is a conceptual diagram illustrating further details of example gas-turbine engines and associated starters, in accordance with one or more aspects of this disclosure.

FIG. 2 is a conceptual diagram illustrating further details of example gas-turbine engines and associated starters, in accordance with one or more aspects of this disclosure. System 200 of FIG. 2 may be an example of system 100 of FIG. 1. As shown in FIG. 2, system 200 may include gas-turbine engines 202A and 202B (collectively, "gas-turbine engines 202") and propulsors 204A and 204B (collectively, "propulsors 204"), pneumatic distribution 205, engine controllers 203A and 203B (collectively, "engine controllers 203"), valves 223A and 223B (collectively, "valves 223"), controller 206, and electrical distribution 207. Gas-turbine engines 202 and propulsors 204 may be examples of gas-turbine engines 102 and propulsors 104.

Gas-turbine engines 202 may each include a compressors of compressors 210A/210B (collectively, "compressors 210"), a combustor of combustors 212A/212B (collectively, "combustors 212"), a turbine of turbines 214A/214B (collectively, "turbines 214"), a power turbine of power turbines 216A/216B (collectively, "power turbines 216"), a low-pressure (LP) spool of LP spools 218A/218B (collectively, "LP spools 218"), a high-pressure spool of HP spools 220A/220B (collectively, "HP spools 220"), a spool speed sensor of spool speed sensors 221A/221B (collectively, "spool speed sensors 221"), an air-turbine starter of air-turbine starters 222A/222B (collectively, "air-turbine starters 222"), an electric starter of electric starters 224A/224B (collectively, "electric starters 224"), and starter connection components of starter connection components 230A/230B (collectively, "starter connection components 230").

In operation, compressors 210 may compress air, combustors 212 may add fuel to the compressed air and combust the resulting mixture, exhaust from the combustion may rotate turbines 214 may and power turbines 216. Turbines 214 and compressors 210 may be coupled to HP spools 220 (e.g., HP shafts). As such, rotation of turbines 214 result in rotation of compressors 210. Power turbines 216 and propulsors 204 may be connected to LP spools 218 (e.g., LP shafts). As such, rotation of power turbines 216 may result in rotation of propulsors 204. While described and illustrated as a free-power turbine, power turbines 216 are not so limited. For instance, in some examples, gas-turbine engines 202 may include LP compressors coupled to LP spools 218. Similarly, in some examples, gas-turbine engines 202 may be three-spool engines.

Spool speed sensors 221 may each be configured to measure a rotational speed of one or more spools (e.g., HP spools, LP spools, intermediate spools, etc.). For instance, spool speed sensor 221A may be configured to measure a rotational speed of HP spool 220A and spool speed sensor 221B may be configured to measure a rotational speed of HP spool 220B. Spool speed sensors 221 may be configured to output a representation of the measured rotational speeds to one or more other components of system 200, such as EECs 203. For instance, spool speed sensor 221A may output a representation (e.g., digital or analog) of the rotational speed of HP spool 220A to EEC 203A and spool speed sensor 221B may output a representation of the rotational speed of HP spool 220B to EEC 203B.

Air-turbine starters (ATSs) 222 may be configured to rotate spools of gas-turbine engines 202 to start gas-turbine engines 202. ATSs 222 may each include a turbine which may generate rotational force when compressed air is expanded across the turbine. Starter connection components 230 carry the resulting rotational force to the appropriate starting spool. For instance, starter connection components 230A may include gears/shafts/etc. configured to carry rotational force from ATS 222A to HP spool 220A such that rotation of the turbine of ATS 222A results in rotation of HP spool 220A.

Electric starters 224 may be configured to rotate spools of gas-turbine engines 202 to start gas-turbine engines 202. Electric starters 224 may each include an electric machine which may generate rotational force using electrical energy. Examples of electric machines that may be included in electric starters 224 include, but are not limited to, alternators, dynamos, permanent magnet machines, field wound machines, synchronous, asynchronous, brushed, brushless, etc. Starter connection components 230 carry the resulting rotational force to the appropriate starting spool. For instance, starter connection components 230A may include gears/shafts/etc. configured to carry rotational force from electric starter 224A to HP spool 220A such that rotation of the electric machine of electric starter 224A results in rotation of HP spool 220A.

As noted above, starter connection components 230 may include components configured to convey rotational force generated by starters (e.g., ATSs 222 and/or electric starters 224) to starting spools (e.g., HP spools 220) of gas-turbine engines 202. As illustrated in the example of FIG. 2, starter connection components 230 may include a tower shaft connected to a gearbox that joins the starters. However, it is understood that other arrangements of starter connection components 230 are contemplated.

In some examples, starter connection components 230 may include one more clutches configured to rotationally de-couple the starters from the starting spools. For instance, starter connection components 230A may include a clutch configured to rotationally decouple electric starter 224A from HP spool 220A. Inclusion of such a clutch may be desirable in that electric starter 224A may be rotationally de-coupled from gas-turbine engine 202A. For instance, in the event of a fault in the electric machine of electric starter 224A, the clutch may be actuated to rotationally de-couple electric starter 224A from HP spool 220A such that a rotor of the electric machine ceases to be driven, thereby mitigating the fault. However, inclusion of such a clutch may present one or more disadvantages. For instance, inclusion of the clutch may add additional weight (e.g., 10, 15, 20 lbs) per engine of gas-turbine engines 202. As noted above, additional weight in the aerospace context is undesirable.

Pneumatic distribution 205 may include various sources of compressed air and components configured to transport the compressed air about the aircraft. Example sources of compressed air include, but are not limited to, an APU (e.g., bleed air from the APU), bleed air from gas-turbine engines 202, compressed air storage tanks, and ground sources (e.g., huffer-cart). Pneumatic distribution 205 may provide the compressed air to various components of system 200. For instance, pneumatic distribution 205 may provide compressed air to ATSs 222 (e.g., as controlled by valves 223).

Valves 223 may control the flow of compressed air to ATSs 222. For instance, valve 223A may selectively allow compressed air to flow from pneumatic distribution 205 to ATS 222A and valve 223B may selectively allow compressed air to flow from pneumatic distribution 205 to ATS 222B. Valves 223 may control the flow of compressed air based on control signals received from other components of system 200, such as EECs 203. For instance, responsive to a signal received from EEC 203A, valve 223A may allow compressed air to flow from pneumatic distribution 205 to ATS 222A.

Electrical distribution 207 may include various sources of electrical power and components to transport the electrical power about the aircraft. Example sources of electrical power include, but are not limited to, an APU (e.g., a generator of the APU), generators of gas-turbine engines 202, ground sources (e.g., ground grid connection or ground power cart), and batteries. Electrical distribution 207 may provide the electrical power to various components of system 200. For instance, electrical distribution 207 may provide electrical energy to controller 206.

Controller 206 may be configured to control operation of various components of system 200, such as electric starters 224. In some examples, controller 206 may be referred to as a common controller or a common electric motor controller in that it may control electric starters of a plurality of gas-turbine engines 202. For instance, controller 206 may control both electric starter 224A and electric starter 224B. As discussed in further detail below, controller 206 may include one or more power switches configured to generate power signals to drive electric starters 224 and/or one or more multiplexors.

Engine controllers 203 may be configured to control various functions of gas-turbine engines 202. Engine controllers 203 of any of the above aspects may be implemented as a single controller or multiple separate (e.g., distributed) controllers. Engine controllers 203 may include one or more discrete controllers for each of gas-turbine engines 202. For instance, as shown in FIG. 2, EEC 203A may control functions of gas-turbine engine 202A and EEC 203B may control functions of gas-turbine engine 202B. Thus, engine controllers 203 may be or may form part of a control system. Engine controllers 203 may be implemented in software, hardware or a combination of the two. Engine controllers 203 may be or may be a functional module of an Engine Electronic Controller (EEC) or a Full Authority Digital Engine Controller (FADEC).

Engine controllers 203 may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

In normal ground operation, engine controllers 203 may perform one or more operations to start gas-turbine engines 202. For instance, EEC 203A may cause valve 223A to open, thereby allowing compressed air to flow from pneumatic distribution 205 to ATS 222A. The compressed air may expand across ATS 222A, causing rotation of the turbine of ATS 222A and thereby causing rotation of HP spool 220A. EEC 203A may monitor a rotational speed of HP spool 220A (e.g., via spool speed sensor 221A). Once the rotational speed of HP spool 220A reaches a first threshold rotational speed, EEC 203A may cause fuel to be introduced into combustor 212A and cause firing of ignitors within combustor 212A. Once the rotational speed of HP spool 220A reaches a second threshold rotational speed, gas-turbine engine 202A may be self-sustaining and EEC 203A may cause valve 223A to close. EEC 203B may perform similar techniques to start gas-turbine engine 202B.

As noted above, ATS 222 may be available for starting gas-turbine engines 202 where pneumatic distribution 205 has at least one available source of compressed air. However, in some scenarios, all of the compressed air sources of pneumatic distribution 205 may not be available. For instance, in the event of a dual-engine flameout and a presumptively inoperative APU (e.g., so at to enable the aircraft to be dispatchable without an operative APU), all of the compressed air sources of pneumatic distribution 205 may not be available (e.g., no bleed air from either of gas-turbine engines 202 and no compressed air from the APU).

As discussed above and in accordance with one or more aspects of this disclosure, in some examples, electric starters 224 may be partially rated. While not able/capable of independently starting (e.g., spooling up) gas-turbine engines 202 from rest on the ground, electric starters 224 may still be capable of re-starting gas-turbine engines 202 in the air.

As noted above, gas-turbine engines 202 may be configured such that shafts that drive propulsors 204 (i.e., LP spools 218) may not be connected to any compressors. As such, a windmilling mid-air restart may not be possible as rotation of propulsors 204 may not result in much additional airflow through cores of gas-turbine engines 202 (e.g., through compressors 210, combustors 212, and turbines 214). As such, aspects of this disclosure related to mid-air restart using electric starters 224 may be particular useful in such arrangements.

During a mid-air restart (e.g., an emergency mid-air restart), engine controllers 203 may utilize electric starters 224 to re-start gas-turbine engines 202. For instance, EEC 203A may output a signal to controller 206 that causes controller 206 to utilize electrical energy from electrical distribution 207 to generate and output power signals to electric starter 224A. The power signals may cause a magnetic field in the electric starter that causes a rotor of electric starter 224A to rotate. As noted above, rotational energy of the rotor may be carried to HP spool 220A via starter connection components 230A. The resulting rotation of HP spool 220A may cause a rotational speed of HP spool 220A to reach a level at which fuel can be re-introduced into combustor 212A, thereby enabling a re-start (e.g., re-light) of gas-turbine engine 202A. EEC 203B may perform similar techniques to start gas-turbine engine 202B. In some examples, should the re-light of gas-turbine engine 202A be successful, EEC 203B may utilize ATS 222B to re-start gas-turbine engine 202B (e.g., via cross-bleed).

As described herein, controller 206 may perform re-start of gas-turbine engines 202 in series (e.g., one at a time). Such a series start architecture may enable a reduction in weight of controller 206 and electrical distribution 207 (e.g., as peak power requirements may be halved).

While gas-turbine engine 202A is described as being re-started first, it should be understood that, in some examples, gas-turbine engine 202B may be re-started first. In other examples, only one of gas-turbine engines 202 may be re-started (e.g., in the event that damage to one of gas-turbine engines 202 is known).

In some examples, engine controllers 203 may automatically determine which starters to use to start or re-start gas-turbine engines 202. As one example, responsive to determining that at least one compressed air source of pneumatic distribution 205 is available, engine controllers 203 may automatically determine to utilize at least ATS 222 to start gas-turbine engines 202. As another example, responsive to determining that no compressed air sources of pneumatic distribution 205 are available, engine controllers 203 may automatically determine to utilize electric starters 224 to perform re-start of gas-turbine engines 202. As another example, responsive to determining that all of gas-turbine engines 202 are not operating, engine controllers 203 may automatically determine to utilize electric starters 224 to perform re-start of gas-turbine engines 202. In some examples, engine controllers 203 may receive external signals (e.g., from pilots of aircraft 101) indicating which starts to use to start or re-start gas-turbine engines 202.

When an operation (e.g., a propulsive operation, such as a flight) concludes, gas-turbine engines 202 may be shut off, but various components of gas-turbine engines 202 may retain thermal energy that resulted from operation. Since higher thermal energy fluids have as a tendency to rise, or migrate upwards in a gravity field against the force of gravity due to their reduced density, the retained thermal energy may be unevenly distributed in different portions of gas-turbine engines 202. For example, relatively hot portions may develop at tops of gas-turbine engines 202 while relatively cold portions of gas-turbine engines 202 may develop at bottoms of gas-turbine engines 202.

As the components cool, the components may slightly change size. For certain components, such as spools 218/220 or other components with tight clearances, uneven cooling may be undesirable. For instance, uneven cooling may result in the components undesired contact or seizing, which may frustrate re-start of gas-turbine engine 202 until additional cooling has occurred. The uneven cooling may result in warping of spools 218/220 in a radial direction because thermal expansion of the spools may be different in different portions of gas-turbine engines 202 because a temperature gradient may be caused by the uneven cooling. This condition may be referred to as "rotor bow."

One way to mitigate or prevent rotor bow may be to rotate the rotor after the operation as gas turbine engines 202 cool, which may be called barring. Since thermal energy retained by gas-turbine engines 202 has a tendency to rise, rotation of the spools may reduce the likelihood that upper portions of gas-turbine engines 202 become relatively hot when compared to lower portions of gas-turbine engines 202 during a cooling period after operation.

In some examples, in addition to or in place of controlling electric starters 224 to perform start/re-start of gas-turbine engines 202, controller 206 may control electric starters 224 to perform barring of gas-turbine engines 202. As one example, after shutdown of gas-turbine engine 202A while the aircraft is on the ground, controller 206 may cause electric starter 224A to perform barring of gas-turbine engine 202A (e.g., cause rotation of HP spool 220A). As another example, after shutdown of gas-turbine engine 202B while the aircraft is on the ground, controller 206 may cause electric starter 224B to perform barring of gas-turbine engine 202B (e.g., cause rotation of HP spool 220B).

As discussed in further detail below, the magnitudes of the power signals generated by controller 206 to cause electric starters 224 to perform re-start vs. barring may be different. For instance, the power signals generated by controller 206 to cause electric starters 224 to perform re-start may be high-power signals, while the power signals generated by controller 206 to cause electric starters 224 to perform barring may be low-power signals (e.g., the low-power signals for barring may carry than 150 watts of power, such as 0.1 kw, the high-power signals for starting may carry than 6000 watts of power, such as 10 kW). Put differently, the power signals generated by controller 206 to cause electric starters 224 to perform re-start may result in rotational speeds of HP spools 220 on the order of thousands of revolutions per minute. By contrast, the power signals generated by controller 206 to cause electric starters 224 to perform barring may result in rotational speeds of HP spools 220 on the order of single or double digit of revolutions per minute.

Figure 3:
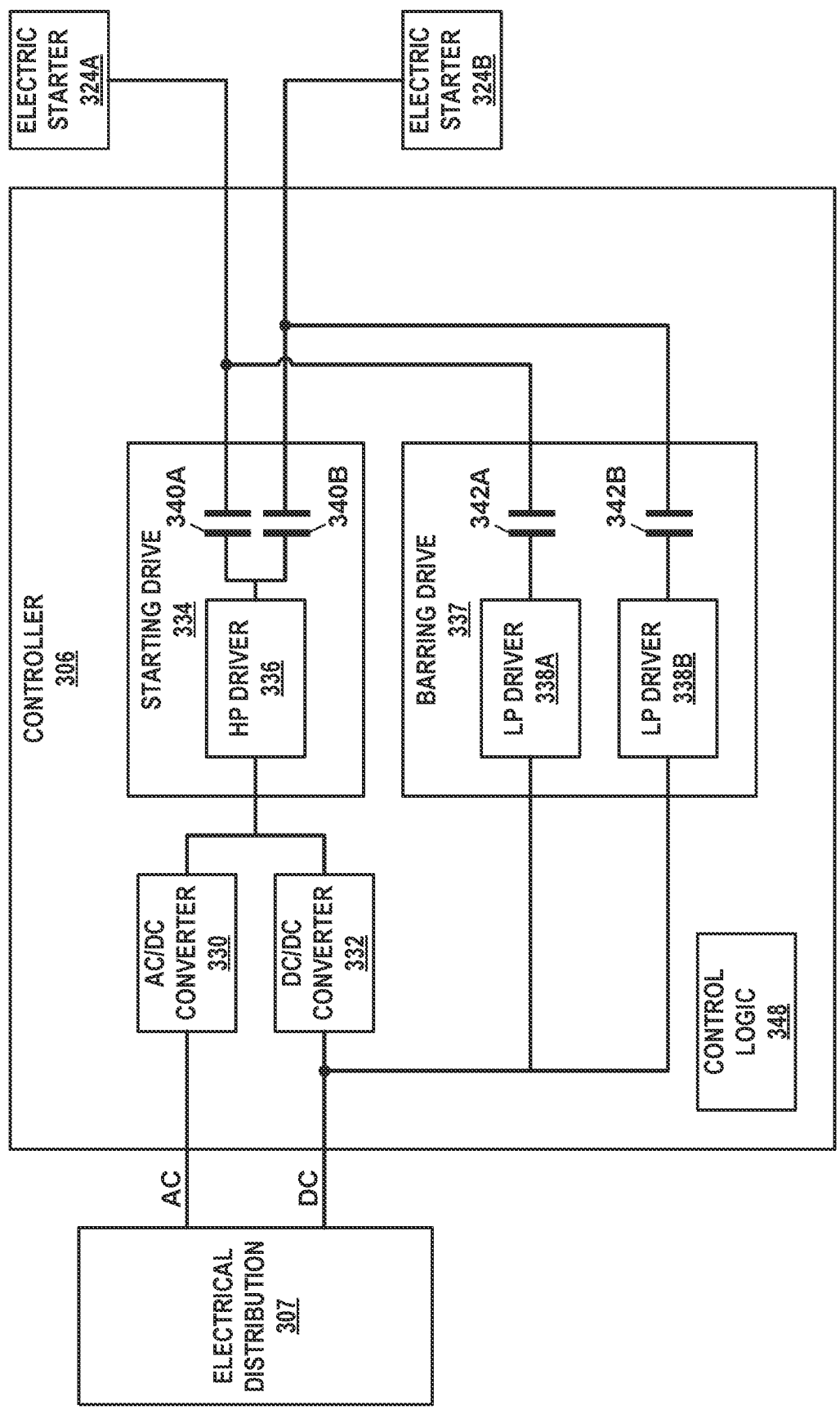
FIG. 3 is a block diagram illustrating further details of example electric starters of gas-turbine engines, in accordance with one or more aspects of this disclosure.

FIG. 3 is a block diagram illustrating further details of an example electric starter controller, in accordance with one or more aspects of this disclosure. Controller 306, electrical distribution 307, and electric starters 324A and 324B (collectively, "electric starters 324") of FIG. 3 may be examples of controller 206, electrical distribution 207, and electric starters 224 of FIG. 2.

As shown in FIG. 3, electrical distribution 307 may supply alternating current (AC) and/or direct current (DC) electrical energy to controller 306. As one example, electrical distribution 307 may supply 115-volt 400 Hz three-phase AC electrical energy to controller 306. As another example, electrical distribution 307 may supply 28-volt DC electrical energy to controller 306. As another example, electrical distribution 307 may supply 28-volt DC electrical energy and 115-volt 400 Hz three-phase AC electrical energy to controller 306.

As shown in FIG. 3, controller 306 may include AC/DC converter 330, DC/DC converter 332, starting drive 334, barring drive 337, switches 340A/340B/342A/342B, and control logic 348. In other examples, controller 306 may include additional components or may omit one or more of the illustrated components.

AC/DC converter 330 may include a rectifier configured to convert AC electrical energy received from electrical distribution 307 into DC electrical energy for use by one or more other components of controller 306, such as starting drive 334. DC/DC converter 332 may include components configured to convert DC electrical energy received from electrical distribution 307 into DC electrical energy for use by one or more other components of controller 306 (e.g., adjust a voltage level or other parameters of the DC electrical energy), such as starting drive 334. In some examples, a voltage level of the DC electrical energy output by AC/DC converter 330 and DC/DC converter 332 may be the same. As such, starting drive 334 may operate using either AC or DC sourced electrical energy.

Starting drive 334 may include components configured to generate power signals to cause electric starters 324 to start gas-turbine engines (e.g., gas-turbine engines 102/202). As shown in FIG. 3, starting drive 334 may include HP driver 336. As discussed in further detail below with reference to FIG. 5, HP driver 336 may include one or more power switches configured to generate, using DC electrical energy received from one or both of AC/DC converter 330 and DC/DC converter 332, high power signals to cause electric starters 324 to start gas-turbine engines. The high-power signals may be DC or AC (e.g., with 1, 2, 3, or more phases).

Barring drive 337 may include components configured to generate power signals to cause electric starters 324 to perform barring of gas-turbine engines (e.g., gas-turbine engines 102/202). As shown in FIG. 3, barring drive 334 may include LP drivers 338A and 338B (collectively, "LP drivers 338"). As can be seen, in contrast to the example starting drive 334 that includes a single HP driver 336, barring drive 337 may include a distinct LP driver for each of electric starters 324.

Switches 340A/340B/342A/342B may be collectively configured to operate as a multiplexor configured to route power signals generated by starting drive 334 and barring drive 337 to electric starters 324. As one example, switches 340A/340B may selectively couple an output of HP driver 336 to either electric starter 324A or electric starter 324B. As such, switches 340A/340B may operate as a multiplexor configured to route, at a particular time, high-power motor control signals generated by HP driver 336 to either electric starter 324A for re-starting a first gas-turbine engine or electric starter 324B for re-starting a second gas-turbine engine. By including such a multiplexor, controller 306 may include a single HP driver 336 that may be sequentially used to generate power signals to perform start/re-start. As another example, switches 342A/342B may selectively couple outputs of LP drivers 338 to electric starter 324.

While illustrated as contactors, switches 340A/340B/342A/342B may be any type of switch. For instance, switches 340A/340B/342A/342B may be relays, solid state switches, contactors, transistors, etc.

Control logic 348 may be configured to control operation of components of controller 306. For instance, control logic 348 may control operation of AC/DC converter 330, DC/DC converter 332, starting drive 334, barring drive 337, and switches 340A/340B/342A/342B. Control logic 348 may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure.

In operation, control logic 348 may cause controller 306 to operate in an off mode, a re-start/start mode, and a barring mode. In the off mode, control logic 348 may cause starting drive 334 and barring drive 337 to disengage from electric starters 324 (e.g., cause switched 340A/340B/342A/342B to open). In the re-start/start mode, control logic 348 may cause DC/DC converter 332 to source DC electrical energy from a battery of electrical distribution 307, cause starting drive 334 to utilize the DC electrical energy to generate power signals, cause one of switches 340A or 340B to close to route the generated power signals to whichever of electrical starters 342 is attached to the gas-turbine engine being re-started. In the barring mode, control logic 348 may cause barring drive 337 to generate power signals (e.g., low power signals), and cause switches 342A and 342B to close to route the power signals to electrical starters 324.

Figure 4:
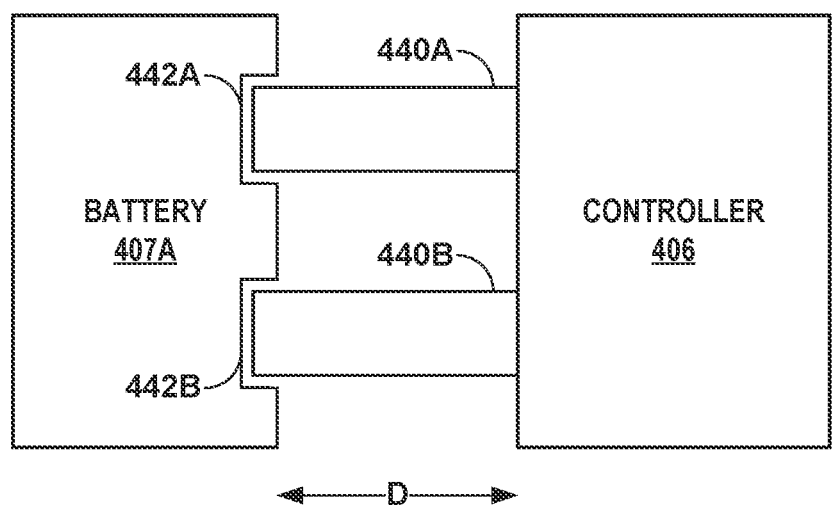
FIG. 4 is a conceptual diagram illustrating example bus-bar interconnection of an electrical motor controller and a battery, in accordance with one or more aspects of this disclosure.

FIG. 4 is a conceptual diagram illustrating example bus-bar interconnection of an electrical motor controller and a battery, in accordance with one or more aspects of this disclosure. Controller 406 of FIG. 4 may be an example of controller 206 of FIG. 2 or controller 306 of FIG. 3. Similarly, battery 407A may be an example of a battery of electrical distribution 207 of FIG. 2 or electrical distribution 307 of FIG. 3.

As discussed above, controller 406 may generate high power signals when performing start/re-start of a gas-turbine engine. For instance, controller 406 may need to generate power signals with a RMS voltage over 100-volts and a power over 10 kW to perform start/re-start of the gas-turbine engine. However, controller 406 may source the electrical energy to generate these high-power signals from a relatively low voltage source, such as battery 407A that may output 14/24/28-volt DC energy. This sourcing of large amounts of power from a low voltage source result in large current flows from battery 407A. The amount of current that may be carried by an electrical cable is proportional to a size of the electrical cable. As such, due to the high current levels between battery 407A and controller 406, relatively large and heavy cables may be needed to connect battery 407A to controller 406. As noted above, increased weight in an aircraft is undesirable.

In accordance with one or more aspects of this disclosure and as shown in FIG. 4, controller 406 may be connected to battery 407A via a plurality of bus bars 440A and 440B (collectively, "bus bars 440"). Bus bars 440 may transport electrical energy between battery 407 and controller 406 (e.g., a common electric starter controller as discussed above). In some examples, bus bars 440 may be directly integrated into controller 406 (e.g., such that bus bars 440 and controller 406 form a single line replaceable unit (LRU)). For instance, bus bars 440 may be directly attached to a board on which a DC/DC converter of controller 406 (e.g., DC/DC converter 332 of FIG. 3) is located. Use of a bus-bar interconnection may provide weight savings over wire/cable interconnection. In this way, aspects of this disclosure reduce weight.

Bus bars 440 may be any suitable shape. Example shapes include, but are not limited to, blades/fins, cylinders, or any of a variety of geometric configurations.

As illustrated in FIG. 4, battery 407A and controller 406 may be separated by a distance D. In some examples, battery 407A and controller 406 may be located relatively close to each other. For instance, D may be less than or equal to 16 inches, less than or equal to 10 inches, or less than or equal to 6 inches. This relatively short distance and the use of bus bars 440 may enable a simplified installation of controller 406. For instance, as discussed above, bus bars 440 may be integral to controller 406 and collectively form a single LRU. This single LRU may be maneuvered into place and bus bars 440 inserted into receptacles 442A and 442B of battery 407A in a single operation.

In general, electrical interconnections on an aircraft may typically be made of cables or wires. For instance, cables and wires provide flexibility to enable relative movement of the components they interconnect (e.g., as the aircraft flexes and changes size due to thermal expansion). However, in examples where distance D is relatively short, relative movement of battery 407A and controller 406 may be minimal, thereby enabling the use of bus bars 440. Furthermore, in some examples, receptacles 442A and 442B may include mechanical biasing components configured to retain bus bars 440 while still allowing for some movement (e.g., spring clamps).

While controller 406 may be connected to battery 407A via bus bars 440, controller 406 may be connected to electric starters (e.g., electric starters 324 of FIG. 3) via electrical cables. As such, the system may include a first set of electrical cables configured to carry power signals from controller 406 to an electric starter of a first gas-turbine engine (e.g., electric starter 324A of FIG. 3); and a second set of electrical cables configured to carry power signals to an electric starter of a second gas-turbine engine (e.g., electric starter 324B). As noted above, in some examples, the gas-turbine engines may be fuselage mounted. In some of such examples, controller 406 and battery 407A may be located in a section of the fuselage proximal to the gas-turbine engines, thereby minimizing a length of the cables.

Figure 5:
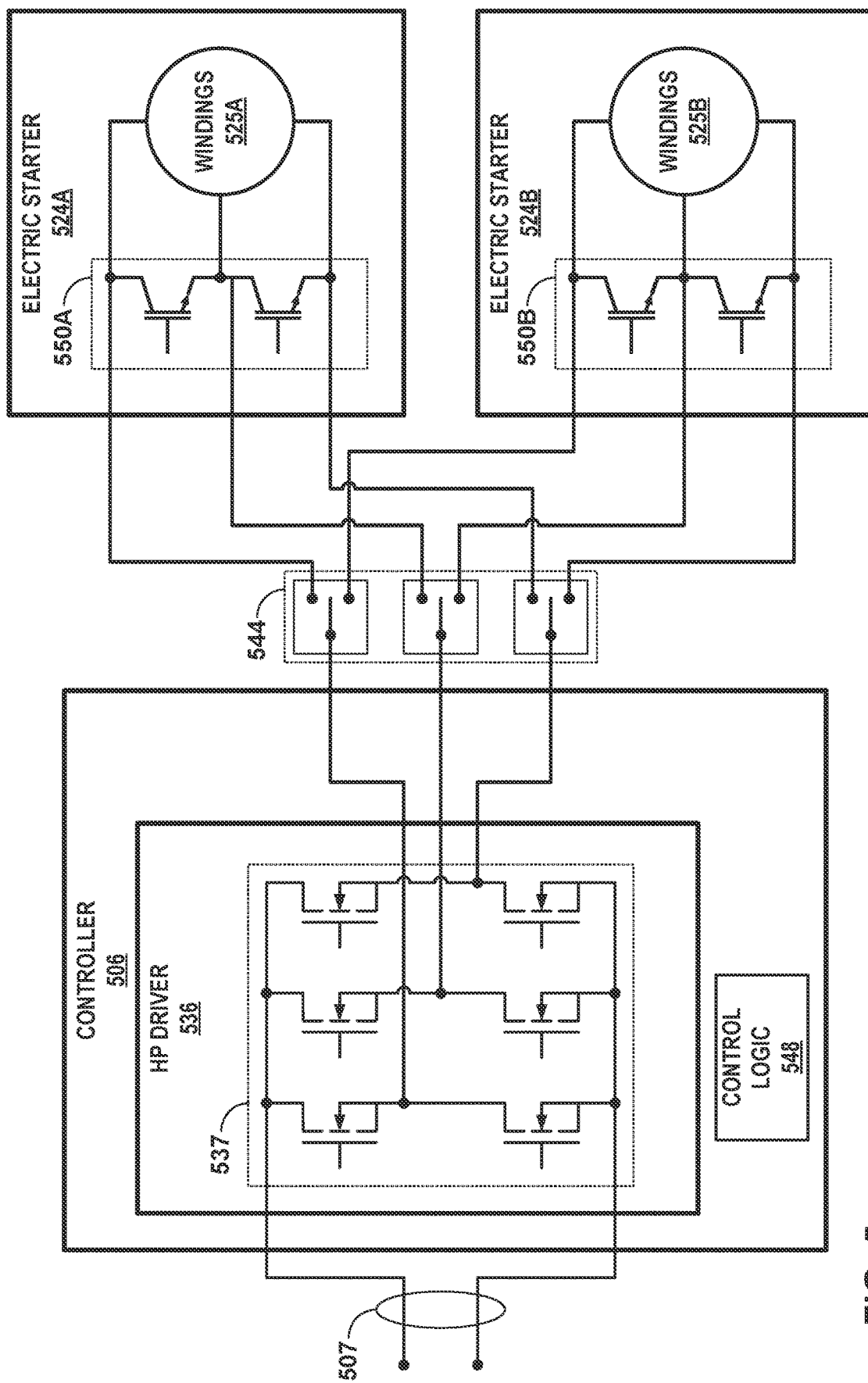
FIG. 5 is a schematic diagram illustrating further details of one example of a motor controller and electric machines with fault-tolerant features, in accordance with one or more aspects of this disclosure.

FIG. 5 is a schematic diagram illustrating further details of one example of a motor controller and electric machines with fault-tolerant features, in accordance with one or more aspects of this disclosure. Controller 506 of FIG. 5 may be an example of controller 206 of FIG. 2, controller 306 of FIG. 3, or controller 406 of FIG. 4. Similarly, electric starters 524A and 524B (collectively, "electric starters 524") may be examples of electric starters 224 of FIG. 2 or electric starters 324 of FIG. 3.

As shown in FIG. 5, HP driver 536 may include switches 537 that are configured to generate power signals for operating electric starters 524. Switches 537 may receive DC electrical energy 507, which may represent an output of one or both of an AC/DC converter (e.g., AC/DC converter 330) or a DC/DC converter (e.g., DC/DC converter 332). Control logic 548 may output signals to gates of switches 537 that cause switches 537 to generate the power signals for operating electric starters 524. As one example, control logic 548 may output signals to gates of switches 537 that cause switches 537 to generate a high power signal (e.g., a three-phase high power signal) for operating electric starters 524.

The power signals generated by switches 537 may be routed to electric starters 524 via multiplexor 544. Multiplexor 544 may perform operations similar to the collective of switch 340A and switch 340B of FIG. 3. For instance, multiplexor 544 may patch the output of switches 537 to electric starter 324A, electric starter 324B, or be open. As such, in some examples, multiplexor 544 may function as a three-way switch.

Each of electric starters 524 may include a rotor and a stator. As shown in FIG. 5, each of electric starters 524 may include a respective set of windings of windings 525A and 525B (collectively, "windings 525"). In some examples, windings 525 may be included on rotors of electric starters 524. In other examples, windings 525 may be included on stators of electric starters 524. The flow of the power signals generated by switches 537 through windings 525 may generate magnetic fields, which in turn may induce rotation of rotors of electric starters 524. In some examples, windings 525 may be series connected windings. For instance, the pole windings of each pole are connected in series so that each phase has one circuit.

Each of electric starters 524 may include one or more poles. In some examples, electric starters 524 may be high pole count electric motors. For instance, a pole count of each of electric starters 524 may be greater than or equal to 10 poles. By being high pole count, electric starters 524 may have a relatively high inductance, which may limit a back EMF. As such, a fault current in electric starters 524 may be steady, which may improve fault tolerance.

As noted above, rotation of the rotors may be transferred into a starting shaft of gas-turbine engines 202 (e.g., HP spools 220). In this way, switches 537 may generate power signals to cause start up of gas-turbine engines 202.

In some examples, it may be desirable to mitigate faults that may occur in electric starters 524. For instance, where an electric starter of electric starters 524 suffers a fault during flight, it may be desirable to mitigate the fault so as to avoid further damage and/or to avoid having to shutdown an engine. As one example, where the electric starter is rotationally coupled to the engine via a clutch, the clutch may be disengaged to mitigate the fault. However, as discussed above, it may be desirable to omit such a clutch (e.g., in order to save weight).

In accordance with one or more aspects of this disclosure, the system may be configured to be fault tolerant. For instance, responsive to detecting a fault in an electric starter of electric starters 524, the system may be configured to apply crowbar (e.g., a three-phase short) to mitigate the fault. In some examples, switches 537 may be configured to perform the crowbar application. In some examples, electric starters 524 may each include a respective set of fault mitigation components 550A and 550B (collectively, "fault mitigation components 550") configured to perform the crowbar application. For instance, responsive to determining to perform the crowbar application on electric starter 524A, fault mitigation components 550A may short the phases together, substantially reducing a current flowing through windings 525A, and mitigating the fault.

Figure 6:
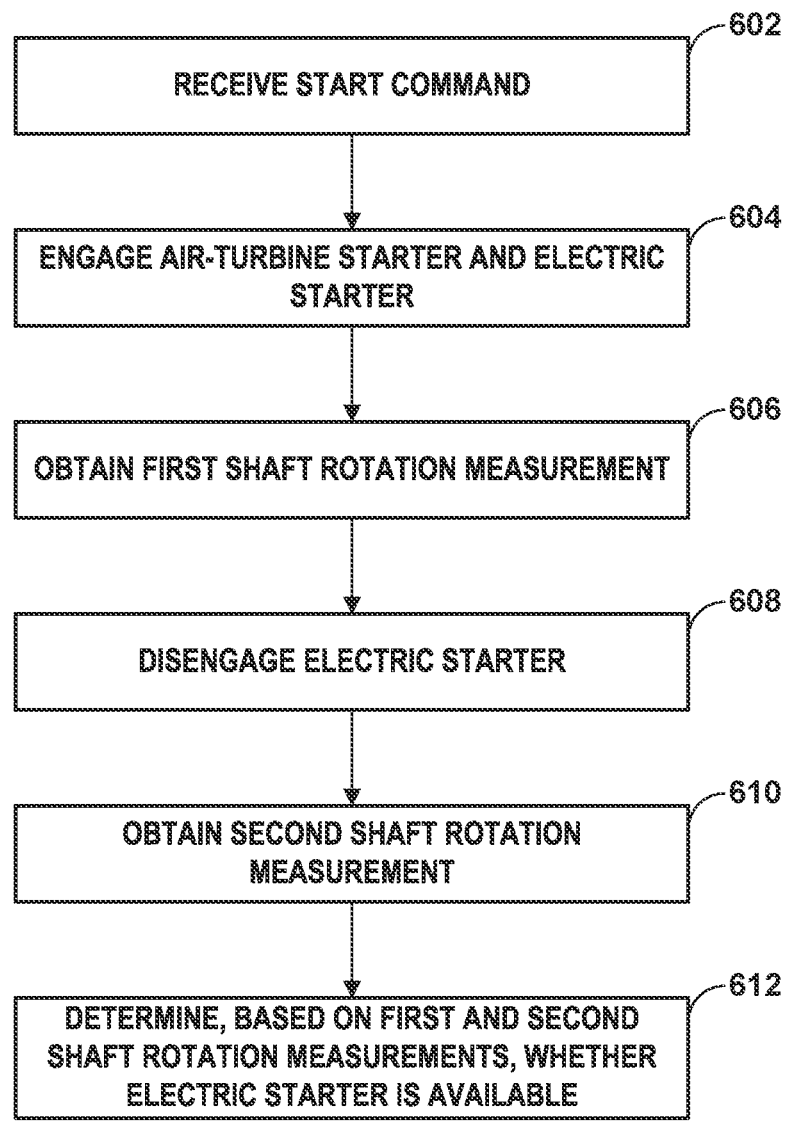
FIG. 6 is a flow diagram illustrating an example technique for verifying electric starter availability, in accordance with one or more aspects of this disclosure.

FIG. 6 is a flow diagram illustrating an example technique for verifying electric starter availability, in accordance with one or more aspects of this disclosure. The technique of FIG. 6 may be performed by one or more components of a system, such as system 100 of FIG. 1 or system 200 of FIG. 2. For purposes of this disclosure, the techniques of FIG. 6 will be discussed with reference to system 200 of FIG. 2.

In general, it may be desirable to determine whether the electric starting system is available for use prior to commencing a flight. For instance, it may be desirable to determine whether electric starters 224 and their power source (e.g., battery 407A of FIG. 4) are soundly operating prior to dispatching the aircraft.

In accordance with one or more techniques of this disclosure, system 200 may be configured to selectively engage electric starters 224 and ATS 222 during start-up of gas-turbine engines 202. Engine controller 203A may receive a start command (602). For instance, a pilot of the aircraft may operate controls in a cockpit of the aircraft to issue the start command to engine controller 203A to start gas-turbine engine 202A.

Responsive to receiving the start command, engine controller 203A may engage ATS 222A and electric starter 224A (604). For instance, during a first portion of a time period, EEC 203A may cause valve 223A to open and cause controller 206 to generate and output power signals to electric starter 224A. As such, during the first portion of the time period, ATS 222A and electric starter 224A may collectively output rotational energy to accelerate HP spool 220A.

Engine controller 203A may obtain first values of one or more parameters of gas-turbine engine 202A, such as a first shaft rotation measurement (606). For instance, during the first portion of the time period, EEC 203A may receive an indication of a rotational speed of HP spool 220A and/or an acceleration rate of the rotational speed of HP spool 220A from spool speed sensor 221A.

Engine controller 203A may disengage electric starter 224A (608). For instance, during a second portion of the time period, EEC 203A may output a signal to cause controller 206 to cease generating and outputting power signals to electric starter 224A. In some examples, engine controller 203A may cause valve 223A to remain open during the second portion of the time period. As such, during the second portion of the time period, ATS 222A may continue to output rotational energy to accelerate HP spool 220A while electric starter 224A ceases to output rotational energy to accelerate HP spool 220A.

Engine controller 203A may obtain second values of the one or more parameters of gas-turbine engine 202A, such as a second shaft rotation measurement (610). For instance, after electric starter 224A has been disengaged, EEC 203A may receive an indication of a rotational speed of HP spool 220A and/or an acceleration rate of the rotational speed of HP spool 220A from spool speed sensor 221A.

In general, electric starter 224A may be considered to be operating correctly when electric starter 224A outputs rotational energy to HP spool 220A in response to receiving power signals from controller 206. As such, an acceleration of HP spool 220A during the first portion of the time period (e.g., when both ATS 222A and electric starter 224A are outputting rotational energy) should be greater than an acceleration of HP spool 220A during the second portion of the time period (e.g., when electric starter 224A is not outputting rotational energy).

Engine controller 203A may determine, based on the values of the one or more parameters measured during the first portion of the time period with values of the one or more parameters measured during the second portion of the time period, whether electric starter 224A is available (612). For instance, engine controller 203A may compare the first shaft rotation measurement with the first shaft rotation measurement to determine whether electric starter 224A is operating correctly. As one example, responsive to determining that the values of the one or more parameters measured during the first portion of the time period are greater than the values of the one or more parameters measured during the second portion of the time period, engine controller 203A may determine that electric starter 224A is available for use in performing mid-air restart of gas-turbine engine 202A. For instance, if the acceleration of HP spool 220A during the first portion of the time period is greater than the acceleration of HP spool 220A during the second portion of the time period, engine controller 203A may determine that electric starter 224A is available for use in performing mid-air restart of gas-turbine engine 202A. Similarly, responsive to determining that the values of the one or more parameters measured during the first portion of the time period are not greater than the values of the one or more parameters measured during the second portion of the time period, engine controller 203A may determine that electric starter 334A is available for use in performing mid-air restart of gas-turbine engine 202A. For instance, if the acceleration of HP spool 220A during the first portion of the time period is not greater than the acceleration of HP spool 220A during the second portion of the time period, engine controller 203A may determine that electric starter 224A is not available for use in performing mid-air restart of gas-turbine engine 202A (e.g., as electric starter 224A may not have been contributing to the acceleration of HP spool 220A during the first portion of the time period).

In some examples, the second portion of the time period may occur after the first portion of the time period. As such, sole use of electric starter 224A to overcome static friction and initially cause rotation of HP spool 220A may be avoided. In this way, wear of electric starter 224A may be avoided, thereby desirably extending a life of electric starter 224A.

It is understood that engine controller 203B may perform a similar procedure to verify availability of electric starter 224B.

Figure 7:
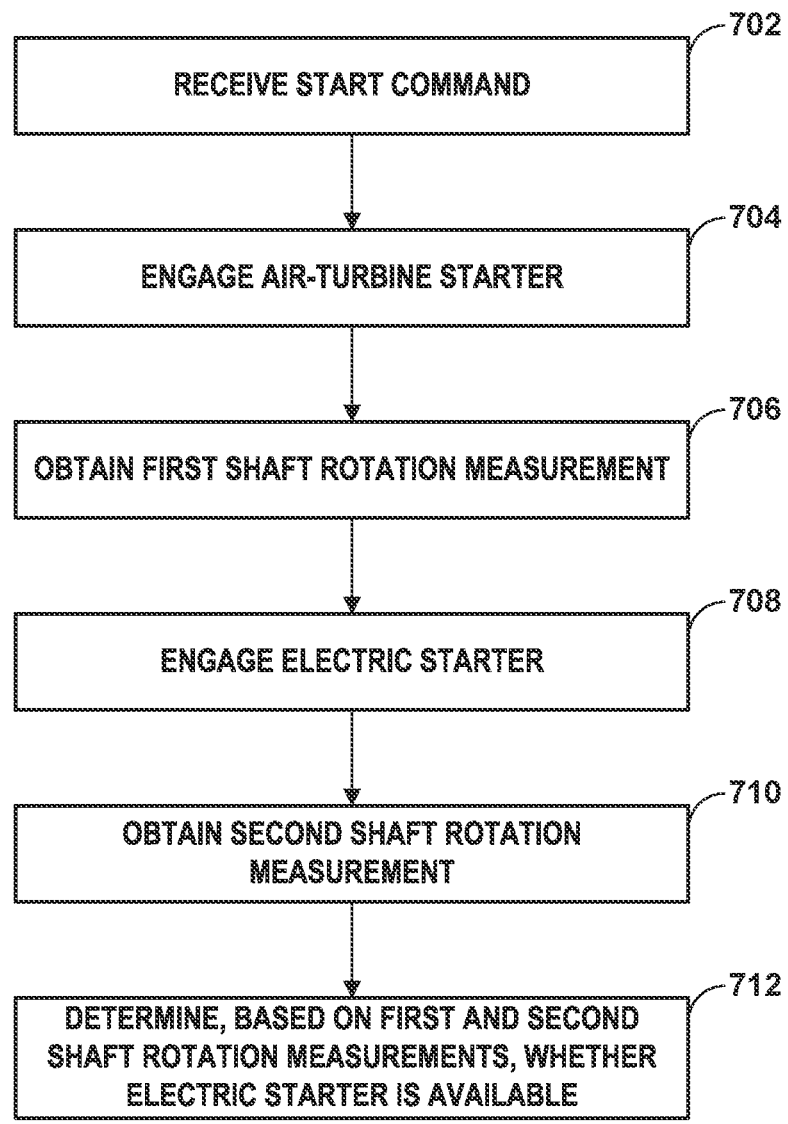
FIG. 7 is a flow diagram illustrating another example technique for verifying electric starter availability, in accordance with one or more aspects of this disclosure.

FIG. 7 is a flow diagram illustrating an example technique for verifying electric starter availability, in accordance with one or more aspects of this disclosure. The technique of FIG. 7 may be performed by one or more components of a system, such as system 100 of FIG. 1 or system 200 of FIG. 2. For purposes of this disclosure, the techniques of FIG. 7 will be discussed with reference to system 200 of FIG. 2.

The technique of FIG. 7 may be similar to the technique of FIG. 6, with a different sequence of starter activation. Engine controller 203A may receive a start command (702). For instance, a pilot of the aircraft may operate controls in a cockpit of the aircraft to issue the start command to engine controller 203A to start gas-turbine engine 202A.

Responsive to receiving the start command, engine controller 203A may engage ATS 222A (704). For instance, during a first portion of a time period, EEC 203A may cause valve 223A to open. As such, during the first portion of the time period, ATS 222A output rotational energy to accelerate HP spool 220A.

Engine controller 203A may obtain first values of one or more parameters of gas-turbine engine 202A, such as a first shaft rotation measurement (706). For instance, during the first portion of the time period, EEC 203A may receive an indication of a rotational speed of HP spool 220A and/or an acceleration rate of the rotational speed of HP spool 220A from spool speed sensor 221A.

Engine controller 203A may engage electric starter 224A (708). For instance, during a second portion of the time period, EEC 203A may output a signal to cause controller 206 to generate and outputting power signals to electric starter 224A. In some examples, engine controller 203A may cause valve 223A to remain open during the second portion of the time period. In other examples, engine controller 203A may cause valve 223A to close during the second portion of the time period, thereby disengaging ATS 222A during the second portion of the time period.

Engine controller 203A may obtain second values of the one or more parameters of gas-turbine engine 202A, such as a second shaft rotation measurement (710). For instance, after electric starter 224A has been engaged, EEC 203A may receive an indication of a rotational speed of HP spool 220A and/or an acceleration rate of the rotational speed of HP spool 220A from spool speed sensor 221A.

Engine controller 203A may determine, based on the values of the one or more parameters measured during the first portion of the time period with values of the one or more parameters measured during the second portion of the time period, whether electric starter 224A is available (712). For instance, engine controller 203A may compare the first shaft rotation measurement with the second shaft rotation measurement to determine whether electric starter 224A is operating correctly. If the values indicate that electric starter 224A is contributing rotational energy to HP spool 220A (e.g., contributing to the acceleration of HP spool 220A), engine controller 203A may determine that electric starter 224A is available.

In any case, engine controller 203A may output an indication as to whether or not electric starter 224A is available (e.g., available for mid-air restart of gas-turbine engine 202A). For instance, based on determining that electric starter 224A is not available for use in performing mid-air restart of gas-turbine engine 202A, engine controller 203A may output an indication as such. The indication may be output via any suitable interface. As one example, engine controller 203A may cause the indication to be output via one or more user-interface devices in the cockpit of the aircraft.

Figure 8:
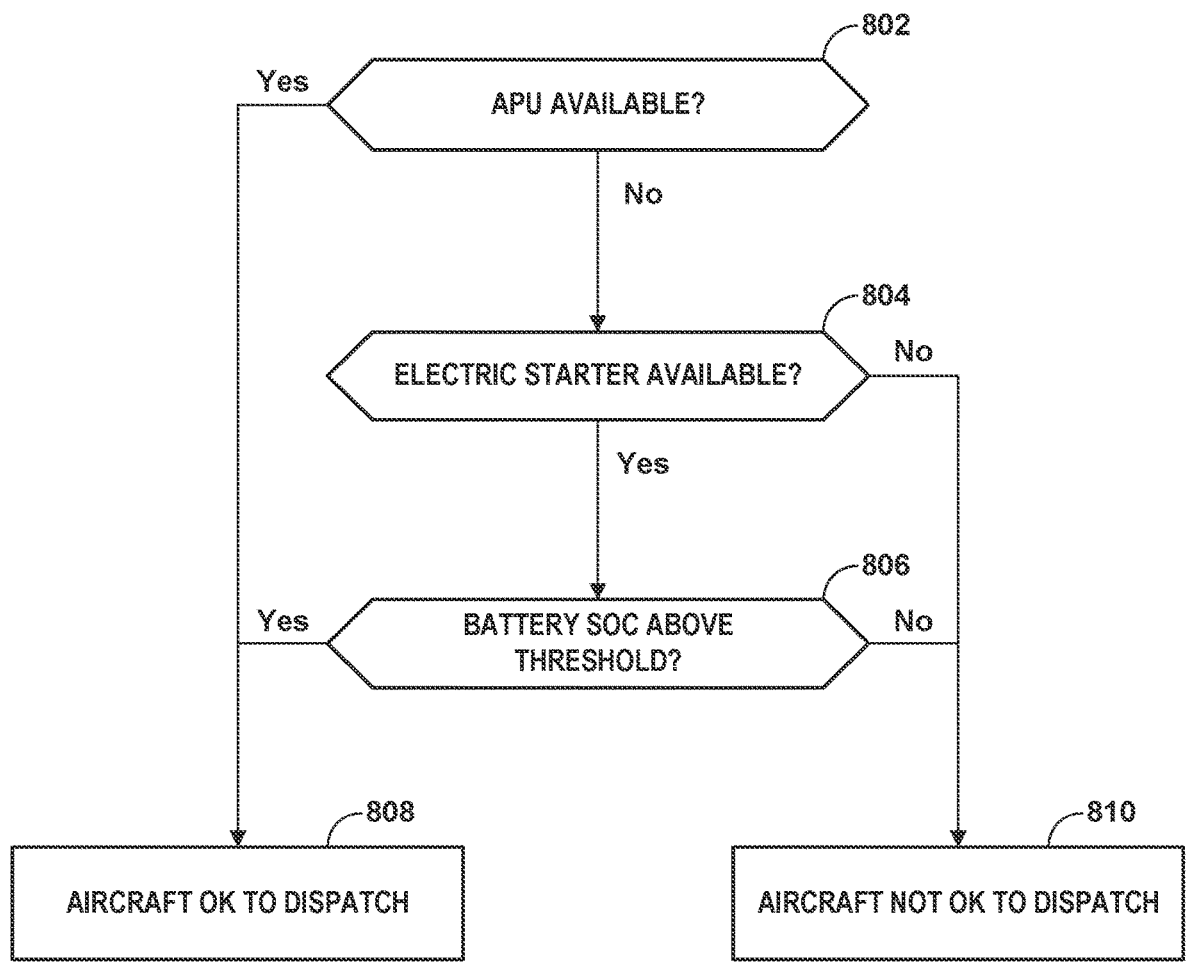
FIG. 8 is a flow diagram illustrating an example technique for determining whether an aircraft is ok to dispatch, in accordance with one or more aspects of this disclosure.

FIG. 8 is a flow diagram illustrating an example technique for determining whether an aircraft is ok to dispatch, in accordance with one or more aspects of this disclosure. The technique of FIG. 8 may be performed by one or more components of a system, such as system 100 of FIG. 1 or system 200 of FIG. 2. For purposes of this disclosure, the techniques of FIG. 8 will be discussed with reference to system 200 of FIG. 2.

As noted above, it may be desirable (e.g., due to regulatory or other requirements) to be able to perform a mid-air re-start of gas-turbine engines 202. As also noted above, system 200 may be able to perform such a mid-air re-start should a source of compressed air, such as an APU, be available or should electric motors 224 be operational and battery 407A have a sufficient state of charge (SoC).

System 200 may determine whether an APU is available (802). For instance, system 200 may determine whether the aircraft (e.g., aircraft 101 of FIG. 1) includes a functional APU capable of supplying compressed air to pneumatic distribution 205.

Responsive to determining that the APU is available ("Yes" branch of 802), system 200 may determine that the aircraft is ok to dispatch. Responsive to determining that the APU is not available ("No" branch of 802), system 200 may determine whether electric starters 224 are available (804). For instance, system 200 may determine whether electric starters 224 are available using the technique of either FIG. 6, FIG. 7, or FIG. 9.

Responsive to determining that electric starters 224 are not available ("No" branch of 804), system 200 may determine that the aircraft is not ok to dispatch. Responsive to determining that electric starters 224 are available ("Yes" branch of 804), system 200 may determine whether a battery used to operate electric starters 224 has an SoC above a threshold (806). For instance, system 200 may determine whether the SoC of battery 407A is greater than a threshold SoC (e.g., a SoC that would provide sufficient power for at least two starting attempts for each of gas-turbine engines 202). Responsive to determining that the battery SoC is above the threshold ("Yes" branch of 802), system 200 may determine that the aircraft is ok to dispatch. Responsive to determining that the battery SoC is not above the threshold ("Yes" branch of 802), system 200 may determine that the aircraft is not ok to dispatch.

Is it understood that some determinations that the aircraft is not ok to dispatch are simpler to remedy than others. For instance, should the battery SoC be below the threshold, system 200 may utilize electrical energy from electrical distribution 207 (e.g., generated by generators of gas-turbine engines 202, ground power, etc.) to charge that battery until the battery SoC is above the threshold.

Figure 9:
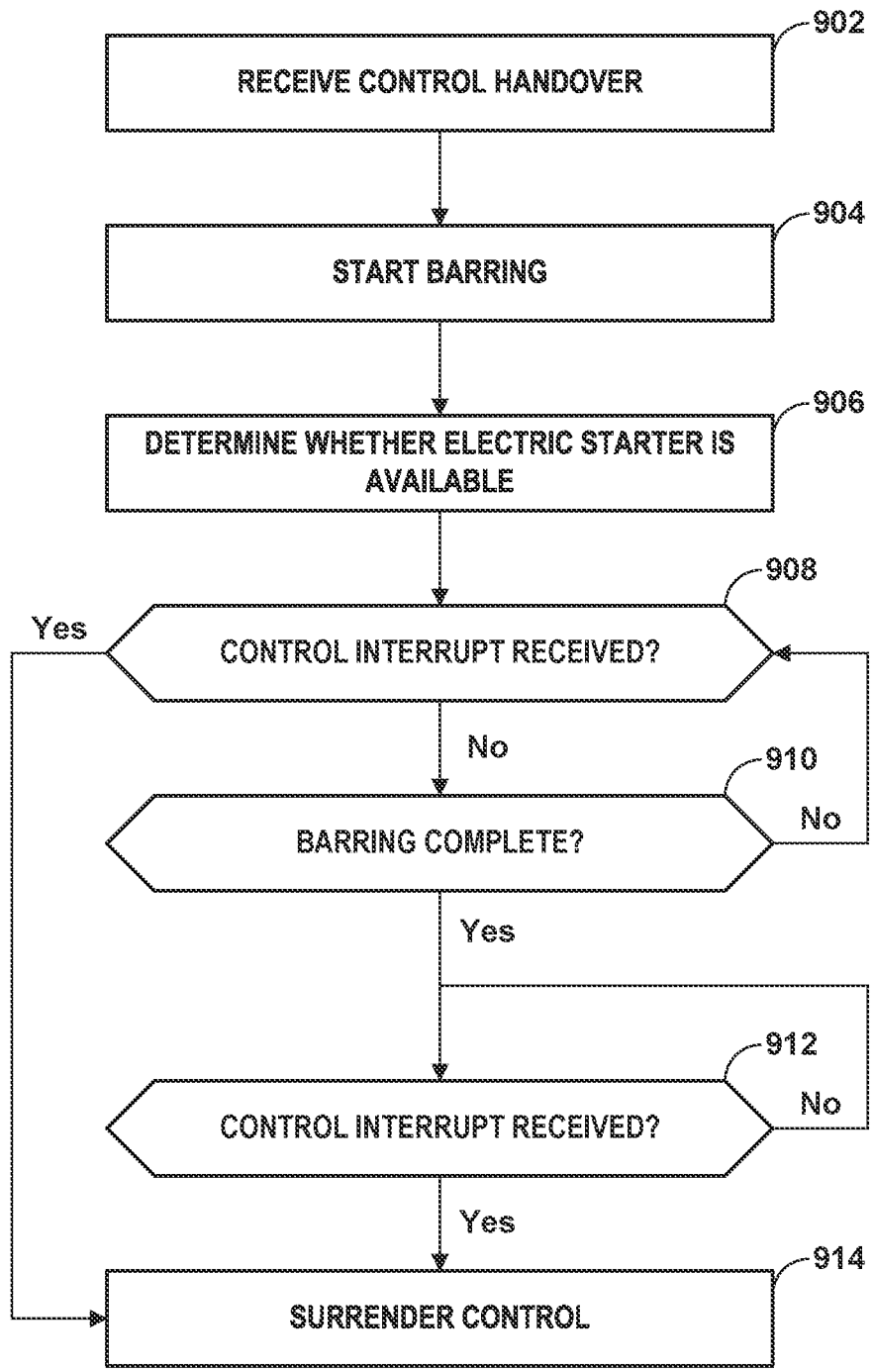
FIG. 9 is a flow diagram illustrating an example technique for verifying electric starter availability, in accordance with one or more aspects of this disclosure.

FIG. 9 is a flow diagram illustrating an example technique for verifying electric starter availability, in accordance with one or more aspects of this disclosure. The technique of FIG. 9 may be performed by one or more components of a system, such as system 100 of FIG. 1 or system 200 of FIG. 2. For purposes of this disclosure, the techniques of FIG. 9 will be discussed with reference to system 200 of FIG. 2.

EEC 209A may transfer control of electric starter 224A to controller 206. For instance, during operation of gas-turbine engine 202A, controller 206 may control electric starter 224A based on commands received from EEC 209A. As such, EEC 209A may be considered to have control over electric starter 224A during operation of gas-turbine engine 202A. However, it may not be desirable for EEC 209A to continue to operate after the operation of gas-turbine engine 202A. For instance, an amount of power consumed by EEC 209A may result in faster than desired depletion of on-board batteries. On the other hand, it may be desirable for electric starter 224A to perform certain operations after gas-turbine engine 202A is shutdown. For instance, it may be desirable for electric starter 224A to perform barring of gas-turbine engine 202A.

In accordance with one or more aspects of this disclosure, EEC 209A may surrender (e.g., transfer, relinquish, handover, etc.) control of electric starter 224A. For instance, as part of a shutdown procedure of gas-turbine engine 202A, EEC 209A may output a message to controller 206 indicating that EEC 209A is handing over control of electric starter 224A to controller 206.

Controller 206 may receive the control handover (902). For instance, controller 206 may receive, from EEC 209A, a message indicating that EEC 209A is handing over control of electric starter 224A to controller 206. While discussed herein with reference to EEC 209A/electric starter 224A, it is understood that controller 206 may receive a similar handover and perform similar operations with respect to EEC 209B/electric starter 224B.

Responsive to receiving the control handover, controller 206 may start barring (904). For instance, control logic 348 may cause switch 342A to close and cause LP driver 338A to generate and output power signals that cause electric starter 224A to slowly rotate HP spool 220A.

As discussed above, in some examples, it may be desirable for system 200 to be able to determine whether electric starters (e.g., electric starters 224) will be available for performing re-starts of gas-turbine engines (e.g., gas-turbine engines 202). In accordance with one or more aspects of this disclosure, system 200 may determine whether electric starters 224 will be available for performing re-starts of gas-turbine engines 202 based on performance of electric starters 224 during the barring procedure (906). For instance, controller 206 may, during barring of gas-turbine engine 202A, measure values of one or more parameters of gas-turbine engine 202A (e.g., a rotational speed of a spool, such as HP spool 220A, of gas-turbine engine 202A). Based on the values of the one or more parameters, controller 206 may determine whether electric starter 224A will be available for use in performing mid-air restart of gas-turbine engine 202A. For instance, as rotation of HP spool 220A during the barring procedure may indicate good operability of electric starter 224A, controller 206 may determine that electric starter 224A will be available for use in performing mid-air restart of gas-turbine engine 202A responsive to determining that the rotational speed of HP spool 220A is greater than threshold rotational speed.

Controller 206 may perform such a check of electric starter 224A several times during the barring procedure, or just a single check at a certain point in the procedure (e.g., at the beginning or after a pre-determined period of time). Following termination of the barring procedure, controller 206 may output a message to one or more other components of system 200 indicating whether electric starters 224 are available for restart of gas-turbine engines 202.

Controller 206 may determine (e.g., while performing the barring procedure), whether a control interrupt has been received (908). For instance, controller 206 may determine whether EEC 209A has requested that controller 206 surrender control of electric starter 224A back to EEC 209A. In some examples, EEC 209A may request that controller 206 surrender control of electric starter 224A back to EEC 209A when EEC 209A is starting gas-turbine engine 202A. Responsive to receiving the control interrupt ("Yes" branch of 908), controller 206 may surrender control of electric starter 224A back to EEC 209A. For instance, controller 206 may output a message to EEC 209A indicating that controller 206 is handing over control of electric starter 224A to EEC 209A.

Where the control interrupt has not been received ("No" branch of 908), controller 206 may continue to perform barring until determining that barring is complete (910). In some examples, controller 206 may determine that barring is complete responsive to determining that one or more barring completion criterion have been met. Example barring completion criterion include, but are not limited to, expiration of a timer, temperature of gas-turbine engine 202 reaching a temperature threshold, and the like. Responsive to determining that barring is complete ("Yes" branch of 910), controller 206 may cease causing electric starter 224A to perform the barring of gas-turbine engine 202A, and may determine whether the control interrupt has been received (912) (it is noted that operation 912 may be similar to operation 908). In some examples, while waiting for the control interrupt to be received ("No" loopback of 912), controller 206 may enter a low-power or other such hibernation/suspend mode.

As noted above, responsive to receiving a request to transfer control of electric starter 224A back to EEC 209A, controller 206 may output a message confirming the transfer of authority over electric starter 224. In some examples, this message may include the indication of whether electric starter 224 is available for use in performing restarts of gas-turbine engine 202A. EEC 209A may utilize this indication to determine whether the aircraft is ok to dispatch. For instance, in some examples, responsive to determining that electric starter 224A is not available, EEC 209A may determine that the aircraft is not ok to dispatch in accordance with the technique of FIG. 8.

In some examples, performing the determination of whether the electric starters will be available during the barring procedure may provide one or more advantages. For instance, determining whether electric starter 224A will be available for performing restarts during the barring procedure may avoid engaging electric starter 224A during the normal start of gas-turbine engine 202A, thereby reducing wear on electric starter 224A and/or reducing a draw from battery 407A.

The following numbered examples demonstrate one or more aspects of the disclosure.

Example 1. A system comprising: a first gas-turbine engine configured to propel an aircraft, the first gas-turbine engine comprising a first electric starter, the first electric starter configured to rotate a spool of the first gas-turbine engine; and one or more controllers collectively configured to: cause, following operation of the first gas-turbine engine, the first electric starter to perform barring of the first gas-turbine engine; measure, during the barring of the first gas-turbine engine, values of one or more parameters of the first gas-turbine engine; and determine, based on the values of the one or more parameters, whether the first electric starter is available for use in performing mid-air restart of the first gas-turbine engine.

Example 2. The system of example 1, wherein the one or more parameters of the first gas-turbine engine include a rotational speed of the spool of the first gas-turbine engine.

Example 3. The system of example 2, wherein, to determine whether the first electric starter is available for use in performing mid-air restart of the first gas-turbine engine, the one or more controllers are configured to: responsive to determining that the rotational speed of the spool of the first gas-turbine engine is greater than a threshold rotational speed, determine that the first electric starter is available for use in performing mid-air restart of the first gas-turbine engine.

Example 4. The system of any of examples 1-3, wherein the one or more controllers comprise: a motor controller; and an electronic engine controller (EEC).

Example 5. The system of example 4, wherein, during a shutdown procedure of the EEC, the EEC is configured to transfer control authority over the electric starter to the motor controller, and wherein, responsive to receiving the control authority, the motor controller is configured to cause the first electric starter to perform the barring of the first gas-turbine engine.

Example 6. The system of example 5, wherein, during the barring, the motor controller is configured to: measure the values of one or more parameters of the first gas-turbine engine; and determine, based on the values of the one or more parameters, whether the first electric starter is available for use in performing mid-air restart of the first gas-turbine engine.

Example 7. The system of example 6, wherein the motor controller is further configured to determine that the barring is complete and cease causing the first electric starter to perform the barring of the first gas-turbine engine responsive to determining that one or more barring completion criterion have been met.

Example 8. The system of example 7, wherein, responsive to receiving a control interrupt from the EEC, the motor controller is configured to surrender the control authority over the electric starter to the EEC.

Example 9. The system of any of examples 7 and 8, wherein, responsive to receiving a control interrupt from the EEC, the motor controller is further configured to output an indication of whether the first electric starter is available for use in performing mid-air restart of the first gas-turbine engine.

Example 10. The system of any of examples 7-9, wherein the motor controller receives the controller interrupt prior to determining that the one or more barring completion criterion have been met.

Example 11. An airframe comprising the system of any of examples 1-10.

Various examples have been described. These and other examples are within the scope of the following claims.

What is claimed is:

1. A system comprising:
a first gas-turbine engine configured to propel an aircraft, the first gas-turbine engine comprising a first electric starter, the first electric starter configured to rotate a spool of the first gas-turbine engine; and
one or more controllers collectively configured to:
cause, following operation of the first gas-turbine engine, the first electric starter to perform barring of the first gas-turbine engine;
measure, during the barring of the first gas-turbine engine, values of one or more parameters of the first gas-turbine engine; and
determine, based on the values of the one or more parameters, whether the first electric starter is available for use in performing mid-air restart of the first gas-turbine engine.

2. The system of claim 1, wherein the one or more parameters of the first gas-turbine engine include a rotational speed of the spool of the first gas-turbine engine.

3. The system of claim 2, wherein, to determine whether the first electric starter is available for use in performing mid-air restart of the first gas-turbine engine, the one or more controllers are configured to:
responsive to determining that the rotational speed of the spool of the first gas-turbine engine is greater than a threshold rotational speed, determine that the first electric starter is available for use in performing mid-air restart of the first gas-turbine engine.

4. The system of claim 1, wherein the one or more controllers comprise:
a motor controller; and
an electronic engine controller (EEC).

5. The system of claim 4, wherein, during a shutdown procedure of the EEC, the EEC is configured to transfer control authority over the electric starter to the motor controller, and wherein, responsive to receiving the control authority, the motor controller is configured to cause the first electric starter to perform the barring of the first gas-turbine engine.

6. The system of claim 5, wherein, during the barring, the motor controller is configured to:
measure the values of one or more parameters of the first gas-turbine engine; and
determine, based on the values of the one or more parameters, whether the first electric starter is available for use in performing mid-air restart of the first gas-turbine engine.

7. The system of claim 6, wherein the motor controller is further configured to determine that the barring is complete and cease causing the first electric starter to perform the barring of the first gas-turbine engine responsive to determining that one or more barring completion criterion have been met.

8. The system of claim 7, wherein, responsive to receiving a control interrupt from the EEC, the motor controller is configured to surrender the control authority over the electric starter to the EEC.

9. The system of claim 7, wherein, responsive to receiving a control interrupt from the EEC, the motor controller is further configured to output an indication of whether the first electric starter is available for use in performing mid-air restart of the first gas-turbine engine.

10. The system of claim 7, wherein the motor controller receives the controller interrupt prior to determining that the one or more barring completion criterion have been met.

11. An airframe comprising the system of claim 1.

12. The system of claim 1, wherein the one or more controllers are collectively configured to:
output an indication whether or not the first electric starter is available for use in performing mid-air restart of the first gas-turbine engine.

13. The system of claim 1, wherein the one or more controllers are collectively configured to:
  perform the mid-air restart of the first gas-turbine engine by at least causing the first electric starter to rotate the spool while fuel is introduced into a combustion chamber of the first gas-turbine engine.

\* \* \* \* \*